United States Patent [19]
Quigley

[11] Patent Number: 6,152,483
[45] Date of Patent: Nov. 28, 2000

[54] SWITCHING UNIT FOR DISABLING A PASSENGER AIRBAG

[75] Inventor: Douglas J. Quigley, Rochester Hills, Mich.

[73] Assignee: Chrysler Corporation, Auburn Hills, Mich.

[21] Appl. No.: 09/095,171

[22] Filed: Jun. 10, 1998

[51] Int. Cl.$^7$ .................................................. B60R 21/32
[52] U.S. Cl. ............................................. 280/735; 70/424
[58] Field of Search ........................... 280/735; 180/282; 307/10.1; 70/278.1, 278.2, DIG. 43, DIG. 56, 424, 455

[56] References Cited

U.S. PATENT DOCUMENTS

| | | | |
|---|---|---|---|
| 4,282,732 | 8/1981 | Bennett | 70/455 |
| 5,544,914 | 8/1996 | Borninski et al. | 280/735 |
| 5,609,363 | 3/1997 | Finelli | 280/743.2 |
| 5,816,611 | 10/1998 | Parn | 280/735 |
| 5,866,954 | 2/1999 | Daniel et al. | 307/10.1 |
| 5,915,725 | 6/1999 | Cuddihy et al. | 280/735 |

*Primary Examiner*—Paul N. Dickson
*Assistant Examiner*—Faye M. Fleming
*Attorney, Agent, or Firm*—Mark P. Calcaterra

[57] ABSTRACT

A switching unit for selectively disabling a passenger airbag of a motor vehicle includes a housing having an opening and a cylinder having a key slot accessible within the opening. The switching unit further includes a plug which can be inserted into the opening for preventing moisture and other debris from contaminating the key slot of the key cylinder. The plug is further operative for visually indicating the operational status of the passenger airbag. In the preferred embodiment, the plug and housing include cooperating indicia for automatically indicating the operational status of the airbag.

20 Claims, 2 Drawing Sheets

SWITCHING UNIT FOR DISABLING A PASSENGER AIRBAG

BACKGROUND OF THE INVENTION

1. Technical Field

The present invention generally relates to a disable switch for a motor vehicle passenger airbag. More particularly, the present invention relates to a switching unit for disabling a passenger airbag including a plug preventing moisture from entering the key cylinder and further operative for visually indicating the operational status of the passenger airbag.

2. Discussion

Modern motor vehicles incorporate various types of inflatable restraints or airbags for passively protecting passengers during predetermined collisions. Known airbags include passenger airbags adapted to deploy from the vehicle dash for protecting a passenger in the front seat of the vehicle. One example of a passenger airbag is shown and described in commonly assigned U.S. Pat. No. 5,609,363. U.S. Pat. No. 5,609,363 is hereby incorporated by reference as if fully set forth herein.

Recently, certain vehicles with passenger airbags have been provided with switches for disabling the passenger airbag. Such switches permit vehicle occupants to selectively control the operational status of the passenger airbag. It is desirable to mount passenger airbag disable switches conspicuously within a vehicle so that the occupants may readily appreciate the operational status of the passenger airbag.

While known switching arrangements for disabling a passenger airbag have proven to be acceptable for selectively deactivating an airbag, all are associated with disadvantages addressed by the subject invention. For example, known airbag disable switches include exposed key cylinders which are susceptible to the accumulation of moisture and other debris which may adversely effect operation of the switch. In addition, some known passenger airbag disable switches utilize a lamp for indicating operational status of the airbag which only functions when the vehicle electrical system is energized. Furthermore, the illumination of such lamps is frequently difficult to identify under bright light conditions.

SUMMARY OF THE INVENTION

It is a general object of the present invention to provide an apparatus for preventing the accumulation of moisture and other debris within the key cylinder of a passenger airbag disable switch key cylinder.

It is a more particular object of the present invention to provide an airbag disable switch having a housing and a cooperating plug for preventing moisture and other debris from entering the key cylinder.

It is another object of the present invention to provide a switching unit for disabling an airbag having a housing and a cooperating plug which visually indicate the operational status of the passenger airbag.

In one form, the present invention provides an apparatus for use in combination with an occupant restraint system for a motor vehicle. The occupant restraint system includes an electrical switch for controlling the operational status of an airbag. The apparatus additionally includes a housing having an opening and a key cylinder operatively associated with the housing. The key cylinder includes a key slot accessible through the opening. The key cylinder is selectively rotatable between a first position in which the electrical switch is opened and a second position in which the electrical switch is closed. The apparatus further includes a plug for selectively closing the opening in the housing. The plug is operative for preventing moisture and other debris from contaminating the key cylinder.

In another form, the present invention provides an occupant restraint system for a motor vehicle. The occupant restraint system includes a passenger airbag and an electrical switch for controlling the operational status of passenger airbag. The occupant restraint system further includes a switching unit for manually controlling the opening and closing of the electrical switch. The switching unit includes a housing defining an opening and a key cylinder operatively associated with the housing. The key cylinder has a key slot accessible through the opening. The key cylinder is selectively rotatable between a first position in which the electrical switch is opened and a second position in which the electrical switch is closed. The switching unit further includes a plug for selectively closing the opening in the housing. The occupant restraint system preferably includes cooperating indicia provided on the housing and the plug for automatically indicating the operational status of the passenger airbag.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
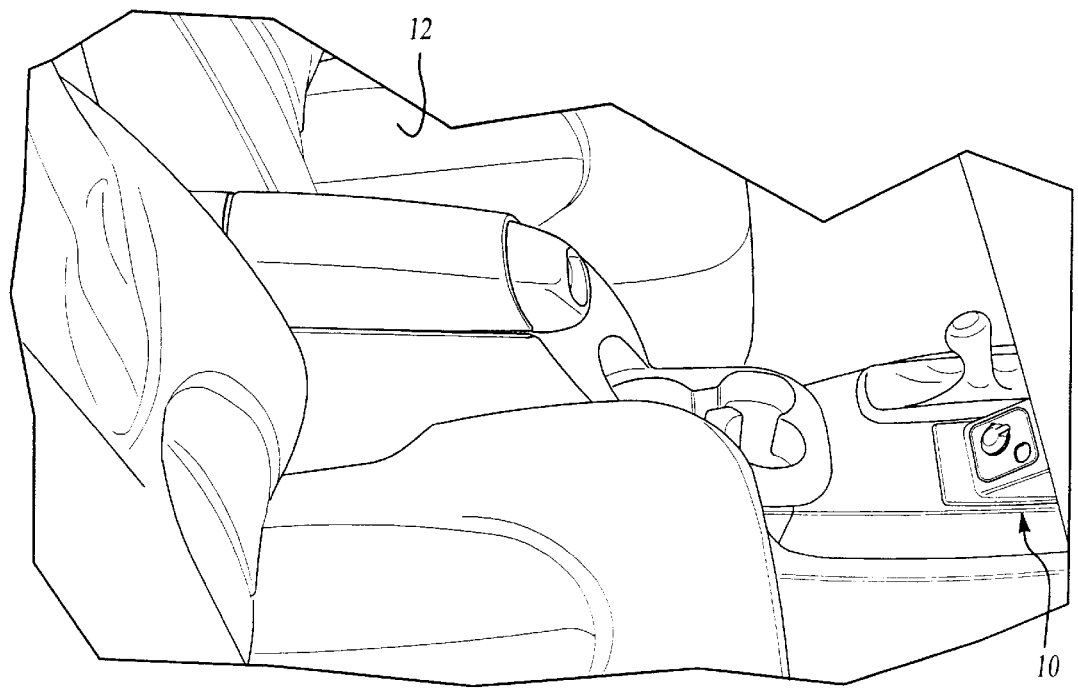
FIG. 1 is a perspective view of a portion of a motor vehicle passenger compartment illustrating a switching unit for selectively disabling a passenger airbag constructed in accordance with the teachings of a preferred embodiment of the present invention.

With initial reference to the environmental view of FIG. 1, a switching unit for manually controlling the operational status of a passenger airbag constructed in accordance with the teachings of a preferred embodiment of the present invention is generally identified at reference numeral 10. The switching unit 10 is shown operatively installed within the passenger compartment of an exemplary motor vehicle 12. The switching unit 10 is particularly adapted for convertibles and off-road vehicles, including but not limited to vehicles sold by the assignee of the present invention under the registered trademark JEEP®. However, it will be understood that the present invention has applicability to other vehicles.

Prior to addressing the construction and operation of the switching unit 10 of the present invention, a brief introduction of the occupant restraint system of the motor vehicle 12 is warranted. As will become apparent below, the switching unit 10 is operable for manually controlling the operational status of a passenger airbag through opening and closing of an electrical switch. However, it will be appreciated by those skilled in the art that other vehicle airbags, including but not limited to a driver airbag may be controlled with the switching unit 10 of the present invention.

Figure 5:
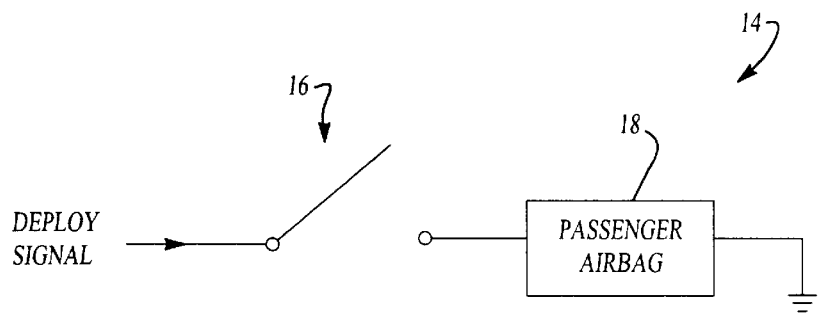
FIG. 5 is a simplified schematic view of an electrical switch controlled by the switching unit and an associated passenger airbag.

As shown in the simplified schematic view of FIG. 5, the occupant restraint system 14 includes an electrical switch 16 located in series with a passenger airbag 18. The electrical switch 16 selectively controls actuation of the passenger airbag 18 by a deploy signal. The electrical switch 16, the control of the airbag 18, and the construction of the airbag 18 are conventional in nature and need not be further described herein.

Figure 2:
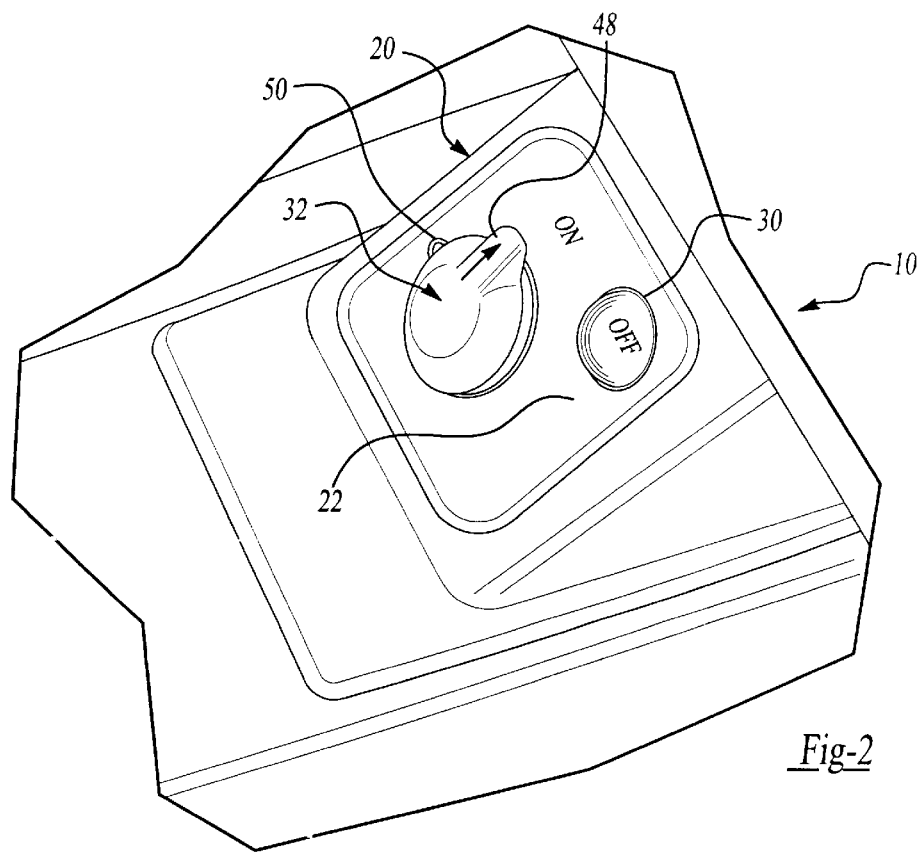
FIG. 2 is an enlarged perspective view of the switching unit of FIG. 1 shown to include a plug operatively inserted into the key cylinder.
Figure 3:
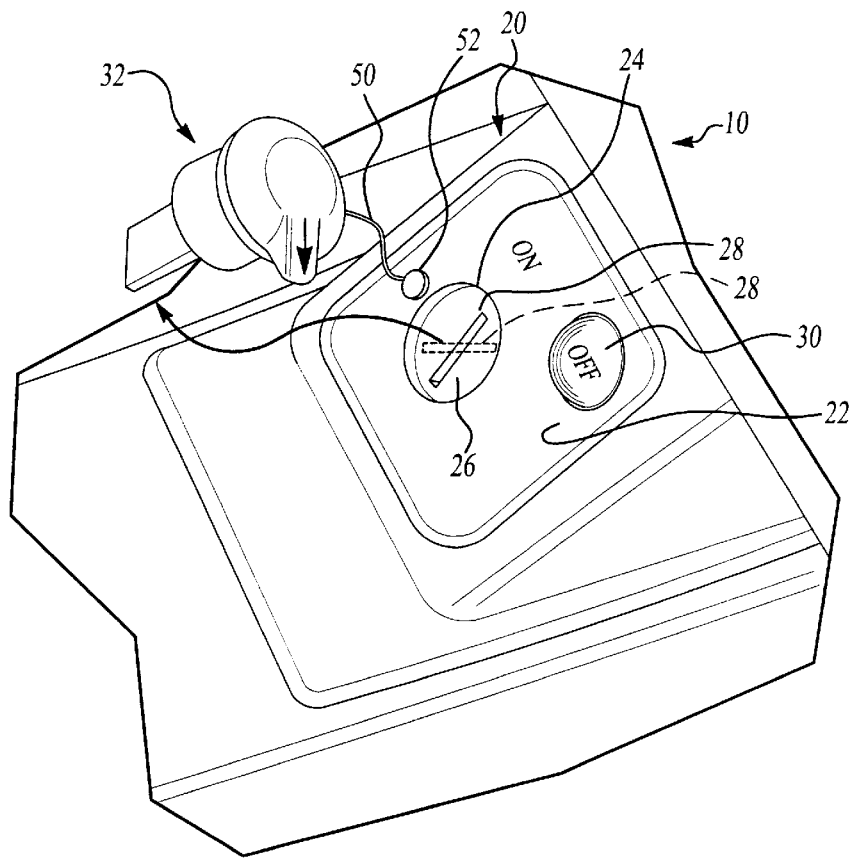
FIG. 3 is an enlarged perspective view similar to FIG. 2 illustrating the plug removed from the key cylinder and further illustrating, in phantom, the key cylinder rotated to an airbag deactivated position or "off" position.
Figure 4:
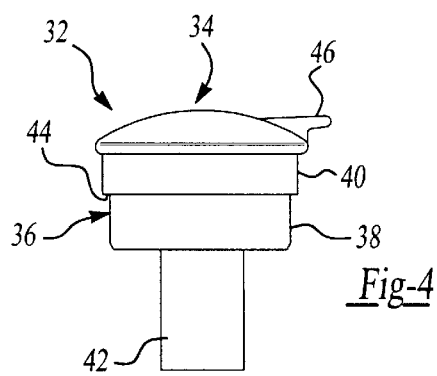
FIG. 4 is an enlarged side view of the key cylinder plug removed from the environment of FIG. 1 for purposes of illustration.

With continued reference to FIG. 1 and additional reference to FIGS. 2–4, the switching unit 10 of the present invention is shown to generally include a housing 20 having a front face 22 defining a generally cylindrical opening 24. In the embodiment illustrated, the front face 22 is disposed at an angle of at least 30° from the vertical and preferably approximately 45° to the vertical for easy viewing by the vehicle occupants. The switching unit 10 further includes a key cylinder 26 including a key slot 28. The key slot 28 is accessible within the cylindrical opening 24 with a key (not shown) for rotating the key cylinder 26 between an "airbag activated" position or "ON" position (shown in solid lines in FIG. 3) and an "airbag deactivated" position or "OFF" position (shown in broken lines in FIG. 3). It will be understood that the electrical switch 16 is conventionally opened and closed in response to movement of the key cylinder 26 between the ON and OFF positions, respectively.

The switching unit 10 of the present invention is shown to further include an indicator or lamp 30 provided on the front face 22. While not specifically illustrated, it will be appreciated by those skilled in the art that the indicator 30 is wired so that it illuminates when the electrical switch 16 is opened. Conspicuous location of the switching unit 10 of the present invention thereby serves to notify vehicle occupants of the operational status of the passenger airbag 18 when the vehicle electric system is energized.

As specifically shown in FIGS. 2–4, the switching unit 10 of the present invention is illustrated to further include a key cylinder plug 32 for closing the opening 24. The plug 32 is unitarily constructed from plastic and functions to prevent moisture or other debris from entering the key slot 28. As will be appreciated below, the plug 32 further functions to visually identify the operational status of the passenger airbag 18.

The plug 32 is shown most clearly in FIG. 4 to generally include a head 34, a shank 36 and an extending tab 42. The shank 36 includes a first portion 38 which has a diameter slightly smaller than the diameter of the cylindrical opening 24 of the housing 20 for frictional retention therein. The shank 36 further includes a second portion 40 which has a diameter slightly greater than that of the cylindrical opening 24. A flange 44 is located between the first and second portions 38 and 40 which abuts the face 22 of the housing 20 when the plug 32 is inserted into the cylindrical opening 24. The head 34 of the plug 32 is generally circular and has a diameter slightly larger than the second portion 40 of the shank 36. The second portion 40 of the shank 36 serves to space the head 34 from the face 22 of the housing 20, thereby facilitating manual grasping of the plug 32. When the plug 32 is inserted into the opening 24, moisture and other debris is prevented from entering the cylindrical opening 24 and thereby contaminating the key slot 28.

The extending tab 42 of the key cylinder plug 32 is adapted to engage the key slot 28 of the cylinder 26 and orient the head 34 of the plug 32 at one of two predetermined positions depending on whether on the switch is OFF or ON. The head 34 of the tab 42 is further formed to include a radially extending portion 46 which extends in a direction parallel to the tab 42. As a result, the radially extending portion 46 aligns with the key slot 28 upon insertion of the tab 42 therein. In the preferred exemplary embodiment, the switching unit 10 of the present invention includes cooperating indicia on the housing 30 and plug 32 for visually indicating the operational status of the passenger airbag 18 when the plug 32 is inserted into the cylindrical aperture 24. As shown in FIGS. 2 and 3, an arrow 48 is provided on the head 34 of the plug 32. The arrow 48 is selectively aligned with the word "ON" provided on the face of the housing and the word "OFF" provided on the lamp 30. Thus, when the vehicle electrical system is not energized but the plug 32 is installed within the cylindrical opening 24, the cooperating indicia located on the head 34 of the key cylinder plug 32 and on the housing 20 will automatically indicate the operational status of the passenger airbag 18.

The key cylinder plug 32 is shown preferably attached to the housing 20 by a tether 50 to prevent the plug 32 from becoming lost when removed from the opening 34. The tether 50 is attached at one end to the head 34 of the key cylinder plug 32 and at the other end to a fastener 52. The fastener 52 engages an aperture (not specifically shown) provided in the housing 20. In the exemplary embodiment illustrated, the fastener 52, tether 50 and key cylinder plug 32 are unitarily constructed from plastic.

While the above description constitutes the preferred embodiment of the invention, it will be appreciated that the invention is susceptible to modification, variation, and change without departing from the proper scope or fair meaning of the accompanying claims.

What is claimed is:

1. In combination with an occupant restraint system for a motor vehicle having an electrical switch for controlling the operational status of an airbag, the electrical switch activated by a key, an apparatus comprising:

a housing including an opening;

a key cylinder operatively associated with said housing, said key cylinder having a key receiving slot accessible through said opening, said key cylinder selectively rotatable by the key between a first switch position in which the electrical switch is open and a second switch position in which the electrical switch is closed; and a key cylinder plug selectively engagable with said key cylinder for closing said opening when the key is removed therefrom, said key cylinder plug including a tab extending into said key receiving slot for orientating said key cylinder plug to a first predetermined position when said key cylinder is in said first switch position and to a second predetermined position when said key cylinder is in said second switch position;

whereby said key cylinder plug prevents moisture and other debris from contaminating said key cylinder but is not operative to rotate said key cylinder between said first and second positions.

2. The apparatus of claim 1, wherein said plug includes a tab, said tab for non-operatively engaging said key slot such that said key cylinder cannot be rotated between said first position and said second position.

3. The apparatus of claim 1, wherein said opening is cylindrical and said plug includes a first cylindrical portion having a diameter slightly smaller for mating reception within said opening.

4. The apparatus of claim 3, wherein said plug includes a head and a second cylindrical portion having a diameter slightly greater than said opening.

5. The apparatus of claim 1, wherein said plug includes a head having a radially extending portion adapted to cooperate with said housing to visually indicate the operational status of the passenger airbag.

6. The apparatus of claim 1, wherein said housing includes a front face having said opening, said front face angled at least 30° from the vertical.

7. The apparatus of claim 1, wherein said plug is tethered to said housing.

8. In combination with an occupant restraint system for a motor vehicle having an electrical switch activated by a key for controlling the operational status of a passenger airbag, an apparatus comprising:

a housing including an opening;

a key cylinder operatively associated with said housing, said key cylinder having a key receiving slot accessible through said opening, said key cylinder selectively rotatable by a key between a first switch position in which the electrical switch is open and a second switch position in which the electrical switch is closed;

a key cylinder plug selectively engagable with said key cylinder for closing said opening when the key is removed therefrom but is not operative to rotate said key cylinder between said first and second positions, said key cylinder plug including a tab extending into said key receiving slot for orientating said key cylinder plug to a first predetermined position when said key cylinder is in said first switch position and to a second predetermined position when said key cylinder is in said second switch position;

cooperating indicia provided on said housing and said key cylinder plug for automatically indicating the operational status of the passenger airbag.

9. The apparatus of claim 8, wherein said cooperating indicia indicates a positive operational status when said key cylinder is rotated to said first position and a negative operational status when said key cylinder is rotated to said second position.

10. The apparatus of claim 9, wherein said key cylinder plug includes a tab, said tab for non-operatively engaging said key slot.

11. The apparatus of claim 9, wherein said plug includes a head having a radially extending portion adapted to cooperate with said housing to visually indicate the operational status of the passenger airbag.

12. The apparatus of claim 8, wherein said opening is cylindrical and said key cylinder plug includes a first cylindrical portion having a diameter slightly smaller than said opening for mating reception with said opening.

13. The apparatus of claim 9, wherein said housing includes a front face having said opening, said front face angled at least 30° from the vertical.

14. The apparatus of claim 9, wherein said key cylinder plug is tethered to said housing.

15. An occupant restraint system for a motor vehicle, the occupant restraint system comprising:

a passenger airbag;

an electrical switch for controlling the operational status of said passenger airbag; and a switching unit for manually controlling opening and closing of said electrical switch, said switching unit including:
  (i) a housing including an opening;
  (ii) a key cylinder operatively associated with said housing, said key cylinder having a key receiving slot accessible through said opening, said key cylinder selectively rotatable between a first switch position in which the electrical switch is open and a second switch position in which the electrical switch is closed;
  (iii) a key for rotating said key cylinder between said first and second positions; and
  (iv) a key cylinder plug for selectively closing said opening when said key is removed therefrom but is non-operative for rotating said key cylinder between said first and second positions, said key cylinder plug including a tab extending into said key receiving slot for orientating said key cylinder plug to a first predetermined position when said key cylinder is in said first switch position and to a second predetermined position when said key cylinder is in said second switch position;

whereby said key cylinder plug prevents moisture and other debris from contaminating said key cylinder when said key is removed therefrom.

16. The occupant restraint system of claim 15, further comprising cooperating indicia provided on said housing and said key cylinder plug for automatically indicating the operational status of the passenger airbag.

17. The apparatus of claim 16, wherein said cooperating indicia indicates a positive operational status when said key cylinder is rotated to said first position and a negative operational status when said key cylinder is rotated to said second position.

18. The apparatus of claim 15, wherein said head includes a radially extending portion adapted to cooperate with said housing to visually indicate the operational status of the passenger airbag.

19. The apparatus of claim 15, wherein said housing includes a front face having said opening, said front face angled at least 30° from the vertical.

20. The apparatus of claim 15, wherein said key cylinder plug is tethered to said housing.

\* \* \* \* \*